United States Patent [19]

Covarrubias

[11] 3,757,810
[45] Sept. 11, 1973

[54] SHEAR VALVE AND FRANGIBLE FITTING

[75] Inventor: George S. Covarrubias, La Puente, Calif.

[73] Assignee: C B F Systems, Inc., Covina, Calif.

[22] Filed: Jan. 11, 1972

[21] Appl. No.: 217,013

[52] U.S. Cl. .................. 137/68, 220/5, 251/273
[51] Int. Cl. ................ F16k 13/06, B67b 7/00
[58] Field of Search .................. 220/47, 89 A; 137/67–69; 222/5

[56] References Cited
UNITED STATES PATENTS

| | | | |
|---|---|---|---|
| 2,777,455 | 1/1957 | Daudelin | 137/68 |
| 3,202,162 | 8/1965 | Eckardt et al. | 220/47 X |
| 3,216,438 | 11/1965 | Prono et al. | 137/68 |

*Primary Examiner*—Robert G. Nilson
*Assistant Examiner*—Richard Gerard
*Attorney*—James M. Heilman

[57] ABSTRACT

A frangible valve which may be operated manually by explosive charge, or by a solenoid. The valve includes a frangible fitting made of a single piece of metal so as to be leak-proof. When the valve is opened, a metal disk is sheared away from the fitting and a hollow cylinder is placed over the sheared portion, aiding in the transfer of a pressurized fluid. A pilot rod extends from the operating piston through a guide hole to insure proper alignment. An external nut can be operated to break the frangible portion, after which a compressed spring completes the operation and retains the hollow cylinder in axial alignment.

10 Claims, 4 Drawing Figures

PATENTED SEP 11 1973 3,757,810
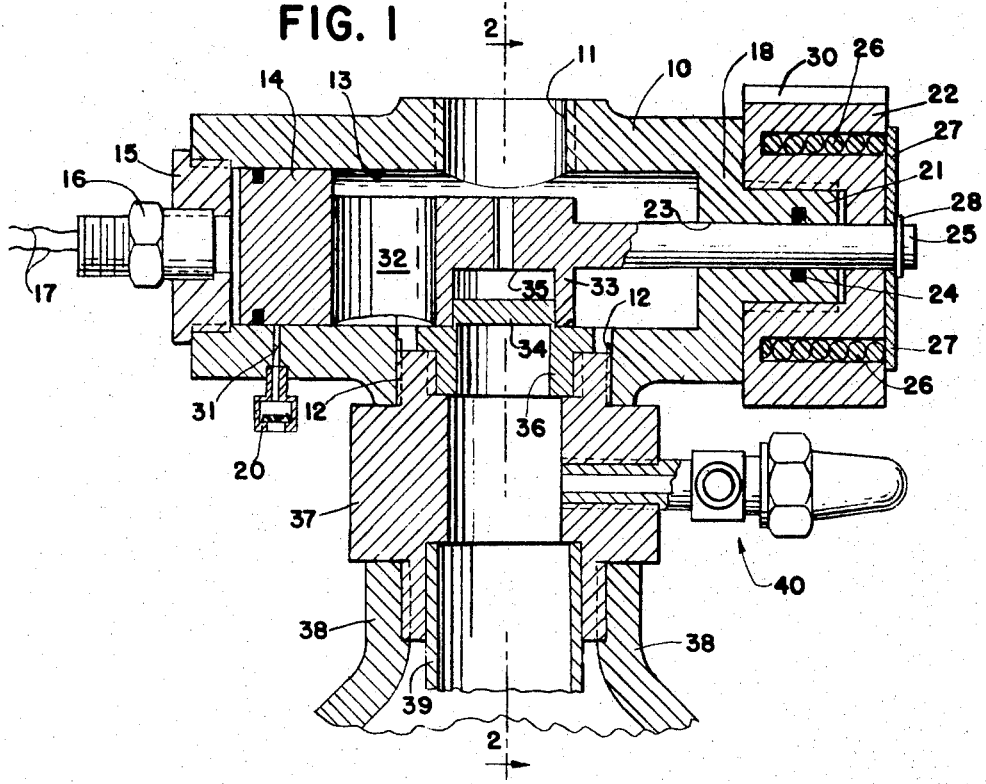
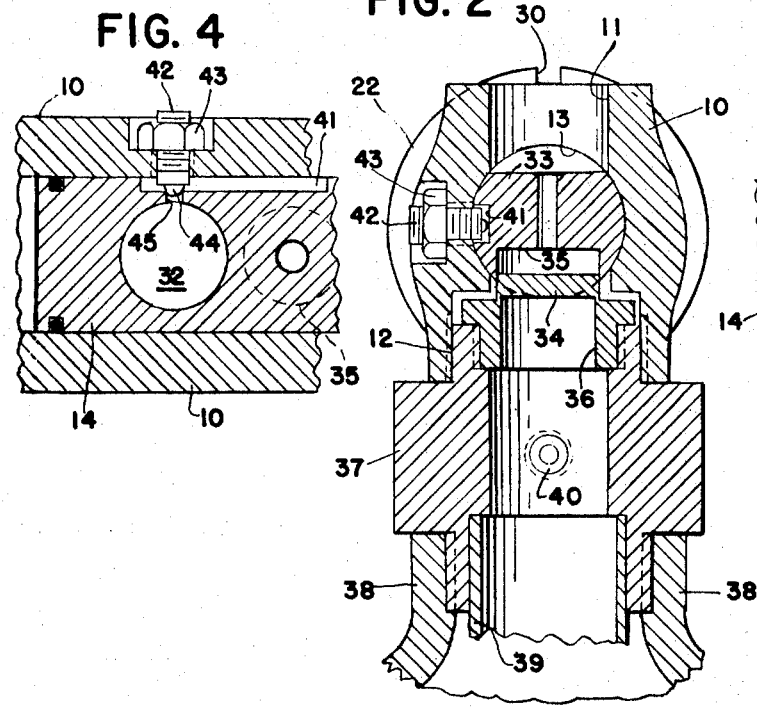
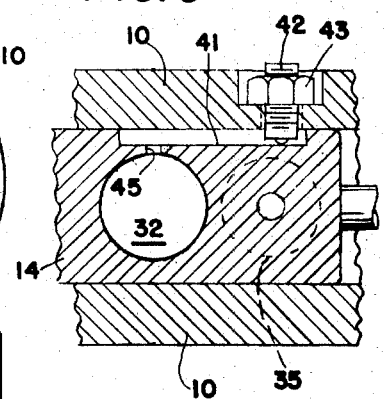

SHEAR VALVE AND FRANGIBLE FITTING

A frangible valve which may be operated manually by explosive charge, or by a solenoid. The valve includes a frangible fitting made of a single piece of metal so as to be leak-proof. When the valve is opened, a metal disk is sheared away from the fitting and a hollow cylinder is placed over the sheared portion, aiding in the transfer of a pressurized fluid. A pilot rod extends from the operating piston through a guide hole to insure proper alignment. An external nut can be operated to break the frangible portion, after which a compressed spring completes the operation and retains the hollow cylinder in axial alignment.

BACKGROUND OF THE INVENTION

The present invention specifically is directed for use with high pressure containers of fire-fighting fluid, such as liquid carbon dioxide, but its use is not limited to this application. The requirements for such a valve are; (a) fast opening, either by manual or automatic control, (b) unobstructed passage-way for the fluid when the valve is opened, and (c) no tendency to leak, even after storage of several years.

The present invention provides such a valve and, in addition, has provision for a rapid replacement of the frangible fitting after a valve opening.

One of the features of the present invention is a piston-type shearing member which is moved transversely of the valve axis to shear off the frangible closure device, and place a hollow cylinder in axial alignment with the valve opening so that the pressurized fluid can escape with a minimum of resistance.

Another feature of the invention is the provision of an explosively actuated charge behind a piston automatic actuation of the valve.

Another object of the invention is the provision of a manually operable nut and spring combination which permits an operator to start the operation of opening the valve and then relies on a compression spring to finish the action at high speed.

Other features and additional details of the invention will be disclosed in the following description, taken in connection with the accompanying drawings.

BRIEF DESCRIPTION OF THE FIGURES

FIG. 1 is a cross sectional view of the complete valve showing most of the operating components.

FIG. 2 is a cross sectional view of the valve shown in FIG. 1 and is taken along line 2—2 of that figure.

FIG. 3 is a cross sectional view of the operating piston, showing an alignment channel and retainer.

FIG. 4 is a cross sectional view similar to FIG. 3 but showing the piston in its operated position, retained by a detent.

DESCRIPTION OF THE PREFERRED EMBODIMENT

Referring now to the figures, the valve includes a housing 10 having an upper exit opening 11 and a lower threaded portion 12 for attaching entrance coupling units. The housing 10 is formed with a transverse bore 13 which is cylindrical at the position occupied by a piston 14. One end of the bore 13 is closed by a threaded plug 15 which contains an explosive charge positioned in a smaller plug 16. The charge, which may be a blank cartridge, is exploded by passing current through two conductors 17. The other end of the bore 13 is closed by a cylinder head 18 which is formed with a hole 23 and a threaded extension 21 for engaging a nut 22. The extension has an annular slot for an "O" ring 24. A pilot pin 25 is coupled to the piston 14 and guides the piston and other operating components in an axial direction when the valve is opened.

The nut 22 is formed with an annular slot in which a compression spring 26 is positioned. The spring 26 is compressed between the bottom of the slot and the inner surface of a back-up washer 27. The back-up washer 27 is held in place by a spring clip 28 fastened to pin 25. The nut 22 is provided with a slot 30 for engaging a spanner wrench when an operator wishes to turn the nut and start an operation.

When the valve is opened manually with spring assistance, the piston 14 is pulled away from the plug 15 and a partial vacuum results between the plug and the piston. To correct this situation, a bleeder hole 31 is drilled in the housing so that air can be admitted to the cylinder bore and the pressures equalized. A check valve 20 is connected to hole 31 so that air cannot escape from the cylinder. This reduces the leakage after the valve is opened.

The piston 14 is formed integral with an adjoining structure including a cylindrical hole 32 and a shearing tool 33 for shearing away closure disk 34 to open the valve. Tool 33 is formed with a cylindrical enclosure 35 which fits over the closure disk 34 as indicated in the figures prior to the opening of the valve. Disk 34 is mounted on a replaceable hollow plug 36 which is threaded at its outside surface and may be screwed into position prior to the final assembly of parts. The disk 34 is attached to the main body of plug 36 by a thin circular piece of metal. This piece, for example, may be 0.015 inch thick and 0.013 inch high.

The hollow plug 36 is mounted in the upper end of an adapter or pipe coupling unit 37 which screws into the housing 10 at its lower end. The coupling unit 37 may contain a threaded hole at its side for installing a filling needle valve 40.

The coupling unit may also be fitted with other components such as a safety unit containing a rupture disk for relieving the pressure if it exceeds a predetermined maximum valve. In addition, a pressure indicator may be installed at this point. These components are not parts of the invention and will not be described in detail.

The bottom portion of the coupling unit 37 is threaded for attaching to a storage cylinder, the upper neck of which is shown at 38. The inner surface of the coupling unit 37 is secured to a dip tube 39 which extends to the bottom of the pressurized storage container to insure that the liquid in the container is discharged first.

In order to retain the piston member in alignment during and after the valve opening operation, a slot 41 (FIGS. 2 and 3) is cut in one side of the piston extending for about half its length. A screw insert 42 is secured to the housing 10 and is clamped in place by a nut 43. At the lower end of the screw 42 a detent ball 44 (see FIG. 3) is positioned, held in place by a coiled spring within the body of the screw (not shown). To aid in retaining the piston in its operating position, a hole 45 is cut in the piston extending from the bottom of slot 41 into the cylindrical cavity 32.

The operation of the valve is as follows: The coupling unit 37 is assembled with its supply conduit 38, the filling valve 40 and the hollow plug 36. Then the supply conduit is connected to a storage container 38 and the container is filled with the desired fluid by means of valve 40. Next, the housing 10 is assembled with all its components and, with the pilot pin 25 held in the position shown, coupling 37 is screwed into the lower opening 12. The valve is now ready for a dispensing operation. An additional pipe, funnel, or nozzle may be attached to the upper exit opening 11. It should be noted that in the stand-by condition the compressed spring would be exerting a force on the pilot pin 25 and the shear tool 33 to shear off disk 34 from the plug 36. However, this cannot occur because of the threaded extension 21 and nut 22.

If the valve is to be operated automatically, current is sent through conductors 17, the charge exploded, and the gas pressure applied to piston 14 moves it to the right, shearing off disk 34 and then placing the hollow cylinder 32 in axial alignment between the opening in plug 36 and the exit opening 11 in housing 10. The fluid contents from the conduit 38 now moves through the valve.

If the valve is to be operated manually, a spanner wrench (not shown) is applied to the nut 22 and turned about one half a revolution. The force of this movement is transmitted through the back-up washer 27, the spring clip 28, and the pilot pin 25, to the shear tool 36, shearing off the disk 34. As soon as the disk is free, the spring 26 moves the pin and the tool to the open position of the valve.

When the piston is in its closed position, the alignment screw is in the position shown in FIG. 3. When the piston is in the open position, the alignment screw 42 is at the other end of the slot with the detent ball 44 extending into the opening 45 as shown in FIG. 4. This detent prevents bounce and missalignment while the flid or gas is moved through the valve.

From the above description of the valve and its operation, it will be evident that a fast-opening valve is available for either automatic or manual operation.

The embodiments of the invention in which an exclusive property or privilege is claimed are defined as follows:

1. A shear valve for opening a pressurized conduit comprising:
   a. a housing including a bore for enclosing valve components, an entrance port, and an exit port intersecting the housing bore;
   b. an elongated valve member movably positioned within the bore and including a piston, a shear tool, a pilot pin, and a portion formed with a cylindrical hole whose axis is transversely aligned with the bore axis and adapted to register with said ports;
   c. a plug closing one end of the bore including an explosive cartridge for creating a pressure within the bore for moving the piston;
   d. a cylinder head closing the other end of the bore formed with a central hole therein for supporting the pilot pin;
   e. a threaded nut attached to the cylinder head and coupled to said valve member for moving same and adapted to be unscrewed from the head when the valve is to be opened by manual control, said threaded nut enclosing a spring coupled to the pilot pin by a back-up washer for moving the elongated valve member when released by said nut, and
   f. a frangible hollow plug secured in the entrance port and formed with a closure disk extending into a hollow portion of the shear tool for sealing fluid in the entrance port when the valve is unactuated and for releasing fluid when the valve is actuated and the shear tool removes the disk from the hollow plug.

2. A shear valve as claimed in claim 1 wherein the piston, the shear tool, the pilot pin, and the portion with the cylindrical hole are all formed from a single piece.

3. A shear valve as claimed in claim 1 wherein said piston is positioned adjacent to the plug.

4. A shear valve as claimed in claim 1 wherein the cylindrical hole is positioned between the piston and the shear tool and is moved into axial alignment with the entrance and exit ports when the tool is actuated.

5. A shear valve as claimed in claim 1 wherein the cylinder head is formed with a threaded extension which meshes with the threaded portion of the nut, said extension arranged in axial alignment with the bore.

6. A shear valve as claimed in claim 1 wherein said piston is retained in its aligned position before, during, and after the opening operation of the valve by means of a longitudinal channel cut in the side of the piston and an inwardly extending pin secured to the housing which engages the channel.

7. A shear valve as claimed in claim 6 wherein a depression is formed in the bottom of said channel and a resiliently mounted ball is secured to the end of the pin in the channel for moving into the depression and thereby retaining the piston in its operated position after the valve is opened.

8. A shear valve as claimed in claim 1 wherein said spring is a helical compression spring and is positioned in an annular slot in the nut.

9. A shear valve as claimed in claim 6 wherein said back-up washer is positioned over the slot in the nut and is coupled to the pilot pin by a spring clip.

10. A shear valve as claimed in claim 6 wherein said frangible hollow plug is formed with a threaded outer surface and is replaceable after the valve has been actuated.

* * * * *